United States Patent [19]
French et al.

[11] Patent Number: 6,161,962
[45] Date of Patent: Dec. 19, 2000

[54] BEARING WITH SENSOR MODULE

[75] Inventors: Michael L. French, Uniontown, Ohio; Jason W. Melvin, Portland, Oreg.; Joseph A. Talafous, Worthington, Ohio

[73] Assignee: The Timken Company, Canton, Ohio

[21] Appl. No.: 09/341,895

[22] PCT Filed: Sep. 12, 1997

[86] PCT No.: PCT/US97/16236

§ 371 Date: Jul. 20, 1999

§ 102(e) Date: Jul. 20, 1999

[87] PCT Pub. No.: WO98/11356

PCT Pub. Date: Mar. 19, 1998

Related U.S. Application Data

[60] Provisional application No. 60/026,071, Sep. 13, 1996.

[51] Int. Cl.$^7$ ............................. F16C 32/00; B61F 15/12
[52] U.S. Cl. ............................................. 384/459; 384/448
[58] Field of Search ..................... 384/448, 459, 384/584, 585, 589, 624

[56] References Cited

U.S. PATENT DOCUMENTS

| | | |
|---|---|---|
| 1,967,806 | 7/1934 | Buckwallter . |
| 2,010,362 | 8/1935 | Herrmann et al. . |
| 2,597,516 | 5/1952 | Noe ............................................ 384/459 |
| 2,856,244 | 10/1958 | Brittain, Jr. ............................... 384/459 |
| 4,063,786 | 12/1977 | Rall ........................................... 384/448 |
| 4,092,053 | 5/1978 | Riegler et al. ............................ 384/448 |
| 4,167,734 | 9/1979 | Logan et al. ......................... 384/624 X |
| 4,237,454 | 12/1980 | Meyer ....................................... 340/682 |
| 4,406,169 | 9/1983 | Ikeuchi et al. ......................... 73/862.54 |
| 4,493,042 | 1/1985 | Shima et al. ............................. 364/507 |
| 4,812,826 | 3/1989 | Kaufman et al. ........................ 340/682 |
| 4,960,333 | 10/1990 | Faye et al. ................................ 384/448 |
| 4,988,220 | 1/1991 | Christiansen et al. ................... 384/448 |
| 5,085,519 | 2/1992 | Dougherty ................................ 384/448 |
| 5,140,849 | 8/1992 | Fujita et al. ............................ 73/118.1 |
| 5,200,697 | 4/1993 | Adler et al. ............................... 324/174 |
| 5,209,580 | 5/1993 | Nakayama ................................ 384/448 |
| 5,221,146 | 6/1993 | Maruyama ................................ 384/447 |
| 5,226,736 | 7/1993 | Becker et al. ............................ 384/448 |
| 5,231,391 | 7/1993 | Rigaux ...................................... 340/448 |
| 5,248,939 | 9/1993 | Brauer ....................................... 324/174 |
| 5,289,120 | 2/1994 | Moretti et al. ............................ 324/174 |
| 5,372,435 | 12/1994 | Genero et al. ............................ 384/448 |
| 5,381,090 | 1/1995 | Adler et al. ............................... 324/174 |
| 5,381,692 | 1/1995 | Winslow et al. ........................... 73/593 |
| 5,440,184 | 8/1995 | Samy et al. ................................ 310/90 |

FOREIGN PATENT DOCUMENTS

| | | |
|---|---|---|
| 0529354A1 | 3/1993 | European Pat. Off. . |
| 571875A1 | 5/1993 | European Pat. Off. . |
| 594550A1 | 4/1994 | European Pat. Off. . |
| 2574501 | 6/1986 | France . |
| 1604990 | 12/1981 | United Kingdom . |
| 2295207A | 5/1996 | United Kingdom . |

*Primary Examiner*—Thomas R. Hannon
*Attorney, Agent, or Firm*—Polster, Lieder, Woodruff & Luccesi, L.C.

[57] ABSTRACT

An antifriction bearing (A) that enables a shaft (4) to rotate with minimum friction in a housing (2) includes a generally cylindrical outer race (46) located in an opening (12) in the housing, an inner race (48) located around the shaft, and rolling elements (50) arranged in rows between raceways on the outer and inner races. The outer race has a cylindrical exterior surface (56), whereas the opening in which the bearing is located has a flat wall (14, 16). A stabilizing block (C) may be attached to the outer race against its cylindrical surface, and this block lies along the flat surface of the housing opening to prevent the outer race from turning in the housing opening. A sensor module (B) is located within the environs of the bearing, and it contains a plurality of sensors (110, 112, 114) which produce signals that reflect conditions under which the bearing operates. Among the conditions monitored are speed, temperature and vibrations.

24 Claims, 7 Drawing Sheets

BEARING WITH SENSOR MODULE

This Appln is a 371 of PCT/US97/16236 filed Sep. 12, 1997 and also claims the benefit of Provisional No. 60/026,071 filed Sep. 13, 1996.

BACKGROUND ART

This invention relates in general to antifriction bearings and more particularly to a bearing having sensors which monitor conditions under which the bearing operates.

Antifriction bearings have rolling elements which roll along raceways on races to significantly reduce friction between a shaft and a housing or between similar components, one of which rotates relative to the other. The rolling elements and raceways require lubrication which often takes the form of grease, and of course, they should be isolated from contaminants such as dirt and water. Seals fitted to the ends of the bearings serve this purpose. Thus, the critical surfaces of antifriction bearings are not exposed and cannot be inspected without removing the bearing from its installation and disassembling it. Indeed, some bearings, such as those used for journals on railcars and those used on mill rolls, are disassembled at periodic intervals for inspection, cleaning and relubrication.

To be sure, devices exist which are designed to monitor operating conditions of bearings. Most sense temperature. For example, railroads use track-side infrared sensors to detect overheated journal bearings in passing trains. Some bearings even come equipped with temperature sensors. In this regard, the absence of adequate lubrication will cause the temperature of a bearing to rise. Also, where a bearing race slips within a housing or on a shaft, the temperature in the bearing will rise owing to the high friction where the slippage occurs. Seizure, as when a rolling element becomes wedged between races, produces an extreme form of slippage. While heat may signal or mark a bearing failure, its presence often does not provide adequate time to avoid a failure.

Apart from the problems identified with detecting bearing failure, bearing races tend to rotate or creep in the structures in which they are mounted, particularly when subjected to shocks. Typical are the outer races of railcar journal bearings which tend to creep in the adaptors for the truck side frames in which they are located. But sometimes creep should be avoided. For example, a refurbished bearing may have a slightly fatigued area in its stationary race and that area should be kept out of the load zone. Also, a bearing equipped with a wired sensor cannot tolerate creep in the race that actually carries the sensor, since creep will eventually sever the electrical leads that connect the sensor with a device for processing the signal generated by the sensor.

The present invention resides in a bearing having a sensor module containing multiple sensors which produce signals that reflect various operating conditions of the bearing, such as angular velocity, temperature and acceleration. The sensor module fits into or adjacent to one of the races. In addition. the invention resides in a bearing having a round outer race equipped with blocks that prevent it from rotating in a housing.

BRIEF DESCRIPTION OF DRAWINGS

In the accompanying drawings which form part of the specification and wherein like numerals and letters refer to like parts wherever they occur.

BEST MODE FOR CARRYING OUT THE INVENTION

Referring now to the drawings, an antifriction bearing A (FIG. 1) fits between a housing and a shaft and enables the shaft to rotate in the housing about an axis X with minimum friction. In the construction illustrated the housing takes the form of a side frame 2 for a railcar truck, while the shaft is an axle 4 on which flanged railcar wheels 6 are mounted. The bearing A, which has a generally cylindrical outer surface, carries a sensor module B (FIG. 3) which contains multiple sensors that monitor the operation and physical condition or "health" of the bearing A. The bearing A also has antirotation or stabilizing blocks C (FIGS. 2 and 3) which prevent it from rotating in the side frame 2.

The side frame 2 is conventional. At each end it has a pedestal 10 (FIGS. 2 and 3) provided with an opening 12 that opens downwardly. The opening 12 has flat side faces 14 and a flat upper surface 16.

The axle 4 and wheel 6 are also conventional. As such the axle 4 projects beyond each of its wheels 6 in the form of a journal 20 (FIG. 1) that emerges from a fillet 22. The bearing A fits over the journal 20 where it is clamped between two wear rings 24 which are in turn clamped between a backing ring 26 that is against the fillet 22, and an end cap 28 that extends over the free end of the journal 20 and is held against the journal 20 with machine bolts 30. The clamping force is provided by the bolts 30 and is resisted at the fillet 22.

The bearing A also lies within the pedestal opening 12 at one end of the side frame 2. To accommodate the cylindrical outer surface of the bearing A to the flat side faces 14 and upper surface 16 of the pedestal opening 12, the pedestal 10 is further fitted with an adaptor 34 (FIGS. 2–4) which is also conventional. Basically, the adaptor 34 has flat surfaces that lie against the side faces 14 and upper surface 16 of the pedestal opening 12. It also has an arcuate surface or seat 36 which is presented downwardly and conforms in contour to the cylindrical exterior surface of the bearing A. At each of the ends of the arcuate seat 36 the adaptor 34 has lips 38 which project inwardly past the seat 36 so that the bearing A will not slide out of the adaptor 34. Similarly, the adaptor 34 engages the pedestal 10 on the side frame 2 so that it will not slide out of the pedestal opening 12.

The pedestal 10 is fitted with a side frame key 40 (FIGS. 2 and 3) which projects beyond one of the side faces 14 of the opening 12 where it lies generally below the cylindrical exterior surface of the bearing A. This prevents the bearing A from dropping out of opening 12, and that of course retains the journal 20 in the side frame 2.

Preferably, the bearing A is a double row tapered roller bearing. As such it includes (FIG. 1) an outer race in the form of a double cup 46, an inner race in the form of two cones 48, rolling elements in the form of tapered rollers 50 arranged in two rows between the cup 46 and cones 48. It also has a spacer ring 52 which fits between the two cones 48 and maintains the proper spacing between the cones 48.. The cup 46 fits into the adaptor 34, whereas the two cones 48 and the spacer ring 52 fit over the journal 20.

The cup 46 has a cylindrical exterior surface 56 which extends between its two ends and conforms to the arcuate seat 36 of the adaptor 34. Indeed, the exterior surface 56 of the cup 46 lies against the seat 36 so that the two lips 38 at the end of the seat 36 are presented at the ends of the cup 46. The lips 38 thus prevent the cup 46 from shifting axially in the adaptor 34. Internally, the cup 46 has two tapered raceways 58 (FIG. 1) which taper downwardly to a cylindrical intervening surface 60 that separates them. The raceways 58 open out of the cup 46 through short end bores 62, and the end bores 62 receive seals 64 which project out of the bearing A and establish live fluid barriers along the wear rings 24.

Whereas the cup 46 has raceways 58 that are presented inwardly toward the axis X, the cones 48 have raceways 66 (FIG. 1) that are presented outwardly—indeed, toward the raceways 58 of the cup 46. Each cup raceway 58 surrounds one of the cones 48 and its raceway 66. In addition, each cone 48 has a thrust rib 68 at the large end of its raceway 66.

Figure 1:
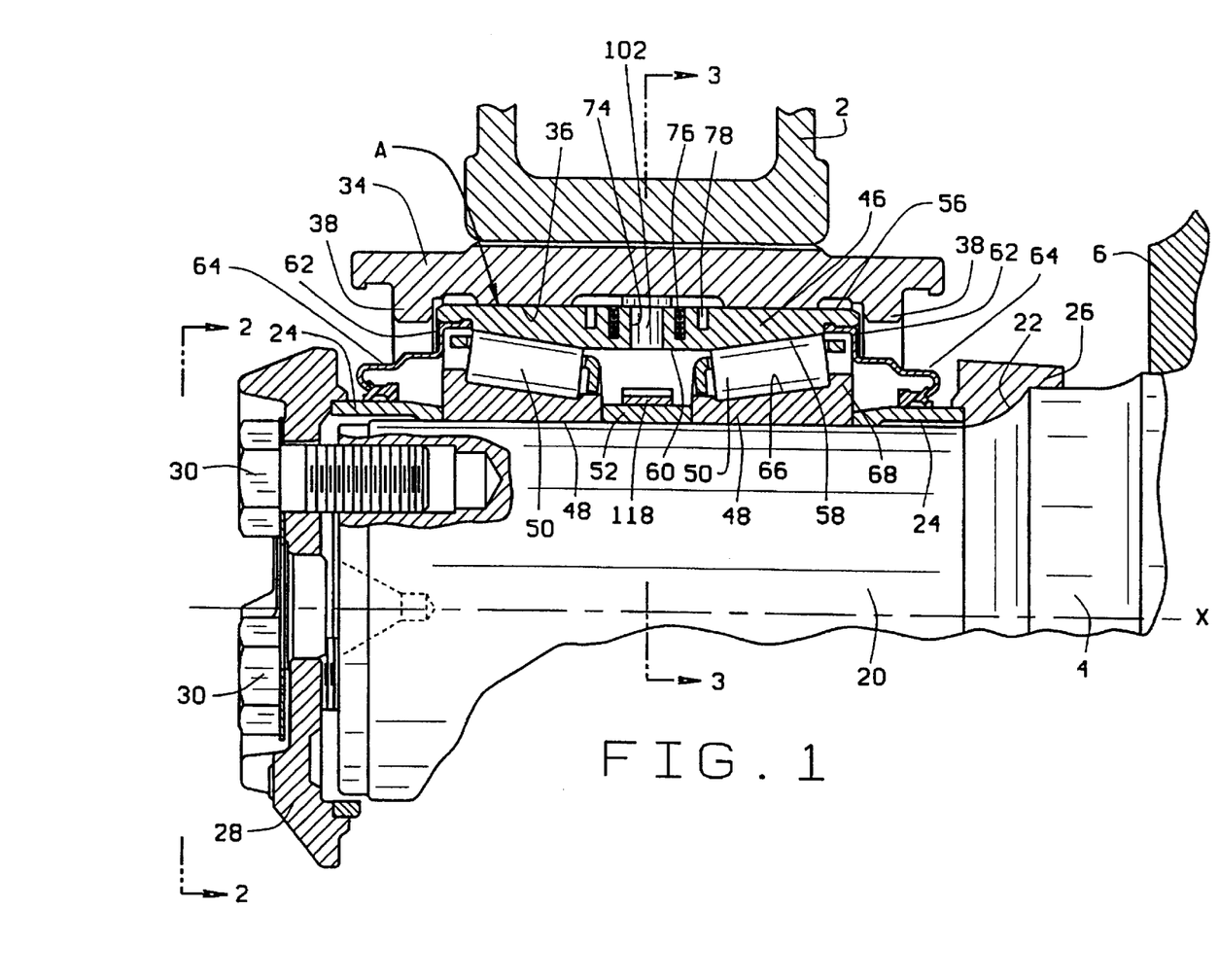
FIG. 1 is a sectional view of a railcar side frame having bearing equipped with a sensor module and stabilizing blocks in accordance with the present invention.
Figure 2:
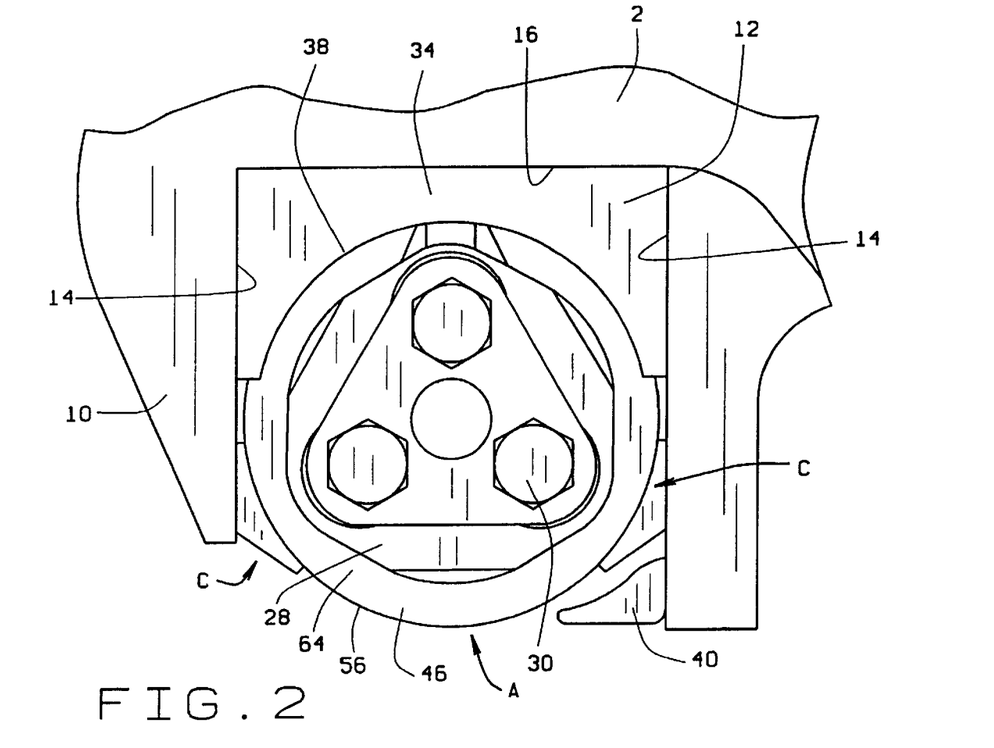
FIG. 2 is a fragmentary end view of the side frame and bearing taken along line 2—2 of FIG. 1.

The tapered rollers 50 lie in two rows between the opposed raceways 58 and 66 on the cup 46 and cones 48, respectively (FIG. 1). Along their tapered side faces, the rollers 50 contact the raceways 58 and 66. The large diameter ends of the rollers 50 lie along the thrust ribs 68 of the cones 48, and the rollers 50 are thus retained in the annular spaces between the cup 46 and the two cones 48. In other words, the thrust ribs 68 prevent the rollers 50 from being expelled from the bearing A. The spacer ring 52 fits between the ends of the two cones 48 and lies immediately inwardly from the cylindrical intervening surface 60 of the cup 46. Its length determines the axial distance between the raceways 66 of the cones 48 and hence establishes the setting for the bearing A.

Figure 3:
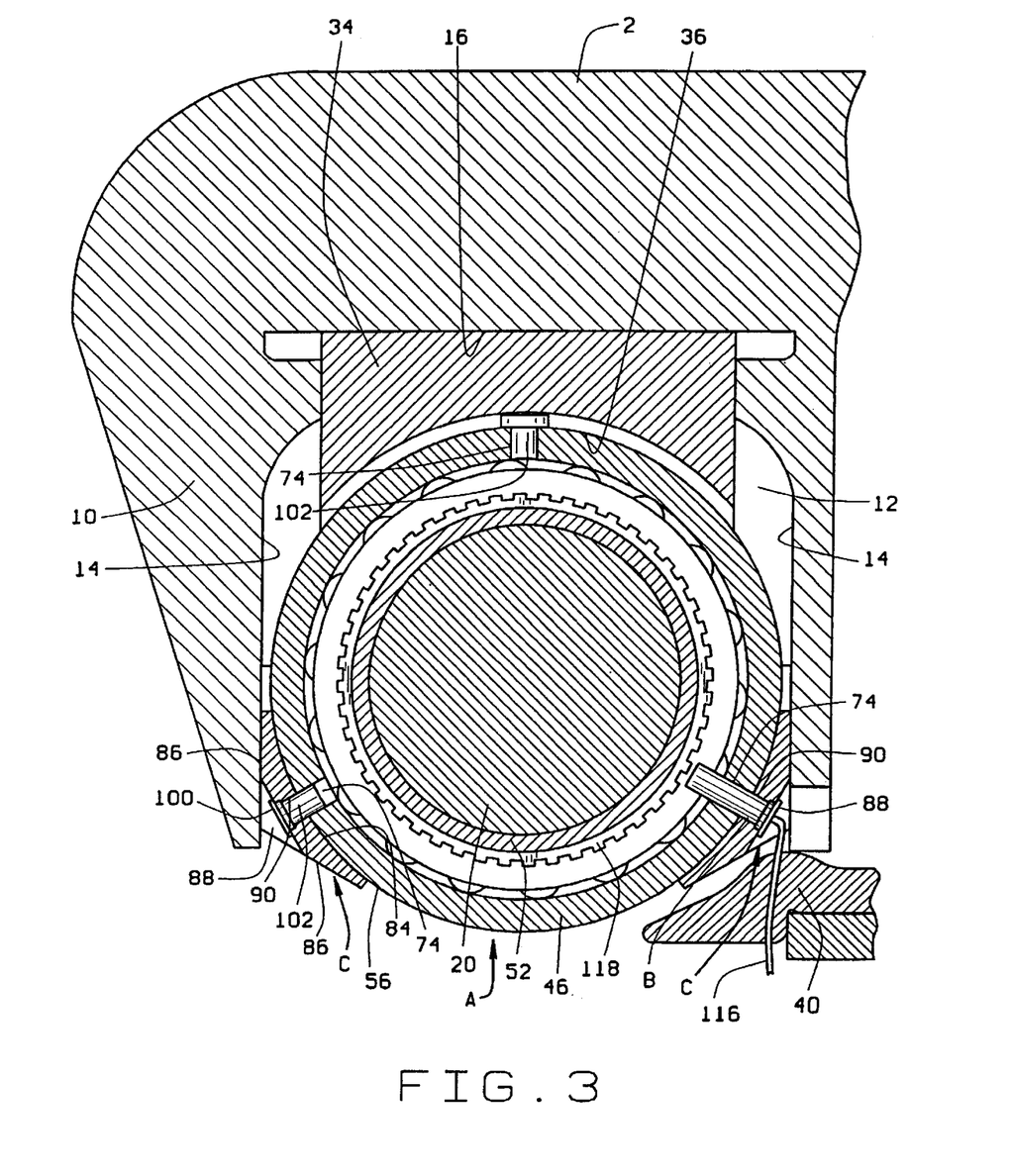
FIG. 3 is a sectional view of the side frame and bearing taken along line 3—3 of FIG. 1.
Figures 4, 5:
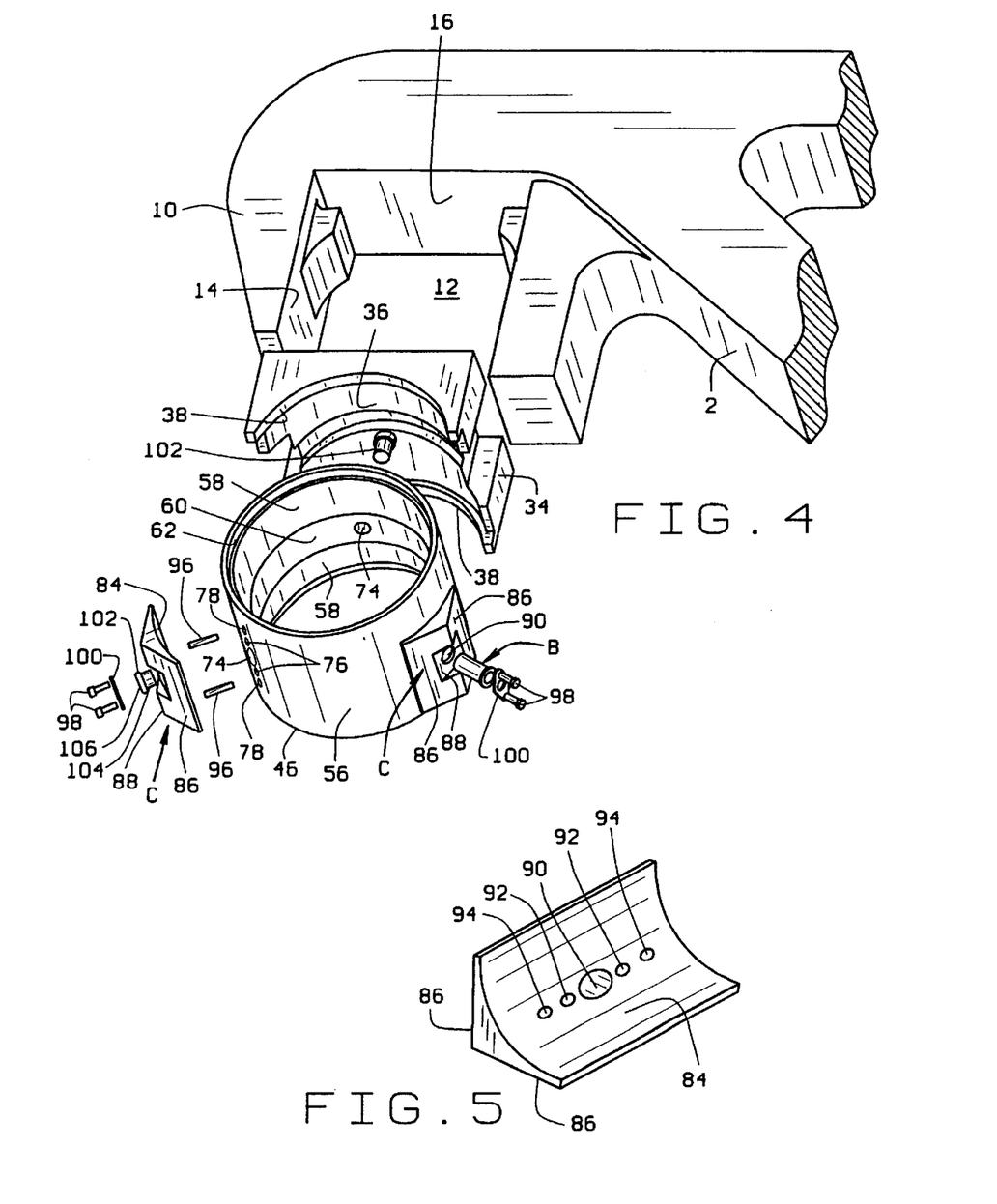
FIG. 4 is an exploded perspective view showing a side frame, bearing cup, stabilizing blocks, sensor module and related component, all of the present invention.
FIG. 5 is a perspective view of one of the stabilizing blocks, showing its arcuate surface.
Figure 6:
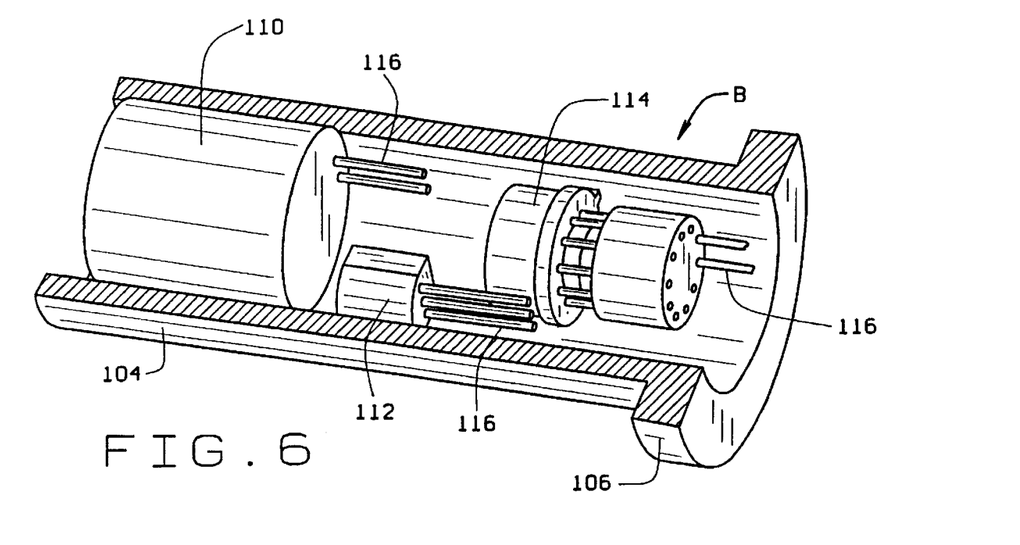
FIG. 6 is a perspective view, partially broken away and in section, of a sensor module containing multiple sensors conceptually depicted.

The bearing A permits the journal 20 to rotate with minimum friction within the pedestal 10 of the side frame 2. Being clamped tightly on the journal 20, the cones 48 and spacer ring 52 rotate with the journal 20. The cup 46, on the other hand, remains stationary in the pedestal 10 of the side frame 2. Actually, the rotating cones 48, acting through the rollers 50, exert a slight torque on the cup 46. In conventional bearings this torque often causes the cup to turn slightly or creep, particularly when the bearing is subjected to shocks which tend to momentarily lessen the friction between the cup and the arcuate seat of the adaptor in which it fits. But the stabilizing blocks C which are attached to the cup 46 of the bearing A, lie along the side faces 14 of the pedestal opening 12 and prevent the cup 46 from rotating in the opening 12. Two stabilizing blocks C are attached to the cup 46 at 120° intervals, and each may serve as a mount for a sensor module B (FIGS. 3 and 4). The blocks C, while securely attached to the cup 46, may be removed and repositioned so as to change the position of the load zone in the cup 46. In this regard, the load zone for the bearing A, when it is set in end play, extends for about 120°, or 60° on either side of top center. From time to time the cup 46 may be rotated 120°, so that different 120° segments of its raceway 58 lie within the load zone where stresses are greatest. This ability to index the cup 46 is in a sense beneficial. For example, it changes the portion of the cup raceways 58 that experience cyclic rolling stresses. Also. it enables one to move a known fatigued region on one of the cup raceways 58 out of the load zone and keep it out of the load zone.

In order to accommodate the stabilizing blocks C and the sensor module B, the double cup 46, at each of three locations, is provided with a module hole 74, smaller threaded holes 76, one at each side of the module hole 74, and pin holes 78 located beyond the threaded holes 76. All of the holes 74, 76 and 78 extend radially with respect to the cup 46 and are arranged one after the other along the exterior surface of the cup 46, that is to say, in an axially directed line (FIGS. 1 and 4). The module hole 74 extends completely through the wall of the cup 46. opening into the interior of the cup 46 through the cylindrical intervening surface 60 midway between the ends of the two cup raceways 58. It is also the largest in diameter of the five holes 74, 76 and 78, and indeed, it is large enough to receive the sensor module B. The holes 74, 76 and 78 are arranged in three sets, with the sets being located at 120° intervals around the cup 46 (FIG. 1). One set of holes 74, 76, 78 is presented directly upwardly and as such is covered by the adaptor 34. Nevertheless, within this set, the hole 74, which passes completely through the cup 46, is plugged to insure that contaminants do not enter the interior of the bearing A through it. The other two sets of holes 74, 76 and 78 lie below the adaptor 34 where they are presented generally downwardly. The stabilizing blocks C extend over the holes 74, 76 and 78 of the two lower sets.

The two stabilizing blocks C are identical. Each is generally triangular in cross-section and long enough to cover all of the holes 74, 76 and 78 of a set. Each has (FIGS. 3–5) an arcuate surface 84, the curvature of which conforms to that of the exterior surface 56 on the cup 46, and two planar side surfaces 86 which are oriented at 120° with respect to each other. The apex formed by the intersection of the two planar surfaces 86 is relieved midway between its ends in the form of a recess 88 having a flat base. At the recess 88 the stabilizing block C is provided with a large module hole 90 and smaller screw holes 92 (FIG. 5). The block C also has pin holes 94 which open out of its arcuate surface 84.

When the block C is properly fitted to the cup 46, the arcuate surface 84 of the block C lies against the cylindrical exterior surface 56 of the cup 46 and the module holes 74 and 90 of the cup 46 and block C, respectively, align. Moreover the screw holes 92 in the block C align with the threaded holes 76 in cup 46, while the pin holes 78 and 94 in the cup 46 and block C also align. Indeed, the pin holes 78 and 94 receive pins 96 (FIG. 4) which are pressed into one or the other and prevent the block C from moving over the exterior surface 56 of the cup 46. Keyways and keys may be substituted for the holes 78 and 94 and the pins 96.

When the two blocks C are so located, one of the planar surfaces 86 on each is oriented vertically, and those vertical surfaces 86 lie in planes that are slightly beyond the exterior surface 56 of the cup 46 where the surface 56 has its greatest lateral projection, that is 90° from top center. This presents the vertical planar surfaces 86 along the flat side faces 14 of the pedestal openings 12 in the side frame 2. The blocks C thus prevent the cup 46 from turning in the adaptor 34 and pedestal opening 12.

Each block C is held in place and further secured against rotation by machine screws 98 (FIG. 4) which pass through the screw holes 92 in the block C and thread into the threaded holes 76 in the cup 46. Actually, the machine screws 98 also secure a retaining plate 100 against the base of the recess 88 in the block C. The retaining plate 100 for one block C holds the sensor module B in the downwardly presented module hole 74 over which the block C extends. The retaining plate 100 for the other block C may hold another sensor B or it may hold a plug 102 in that hole 74. Another plug 102 fits int he upwardly presented hole 74.

Both the sensor module B and the plug 102 in the blocks C have (FIGS. 4 and 5) a somewhat elongated shank 104 and a flange 106 at one end of the shank 104. The shank 104 fits into the module hole 74 in the cup 46, but the flange 106 is too large to pass into that hole. It does however fit into the somewhat larger module hole 90 of the block C, lying completely within that hole. The retaining plate 100 overlies the flange 106 and captures it within the module hole 90 of the block C. Thus, the sensor module B and the plug 102 are retained firmly in their respective module holes 74 in the cup 46. The fit is snug enough to effect a fluid-tight seal, so contaminants do not enter the interior of the bearing B through either of the downwardly presented module holes 74.

The shank 104 of the sensor module B is hollow and long enough to extend into the interior of the bearing A between the two rows of rollers 50. Within its hollow interior, the shank 104 of the module B contains sensors for detecting the operating conditions and physical characteristics or "health" of the bearing A. For example, the module B may contain a speed sensor 110, a temperature sensor 112 and an acceleration sensor 114 (FIG. 5). All three sensors 110, 112 and 114 are retained in the hollow shank 104 of the module B in the proper orientation with a potting compound. On the other hand, the shank 104 could be injection molded with the sensors 110, 112 and 114 embedded in it, or it could have machined recesses for receiving the sensors 110, 112 and 114.

The speed sensor 110 lies at the inner end shank 104 where it is presented toward the spacer ring 52 that separates the two cones 48. The spacer ring 52 carries a target wheel 118 (FIG. 3) which is configured or otherwise constructed to excite the speed sensor 110, causing the sensor 110 to produce a signal that reflects the angular velocity of the cones 48 which is normally the angular velocity of journal 20 and axle 4. To this end, the target wheel 118 may have teeth arranged at equal circumferential intervals along its periphery or alternating magnetic poles. Irrespective of its construction, the speed sensor 110 produces a pulsating signal when the target wheel 118 rotates, and that signal reflects angular velocity.

The temperature sensor 112 detects the temperature in the interior of the bearing A and may provide a digital or analog output. The acceleration sensor 114 senses acceleration along an axis and is oriented such that its sensitive axis preferably extends vertically in a plane parallel to the radial load transferred by the bearing A, although practically any orientation is available. It may provide a digital or analog output signal.

The sensor module B may contain additional sensors as well to detect other operating conditions and physical characteristics of the bearing A. Such other sensors may take the form of acoustic emission sensor or a sensor capable of detecting material strain. If a single sensor module B does not have enough space to accommodate all of the sensors desired, another sensor module B, extended through the other downwardly presented module hole 74 in the cup 46 and through the other stabilizing block C, may be used to hold some of the sensors. Still more sensors may be housed in a sensor module B that extends through the uppermost hole 90 in cup 46, with the adaptor 34 modified to accommodate that module B.

The raw signals derived from the sensors 110, 112 and 114 in the sensor module B require processing and perhaps archival at a remote processing unit 120 (FIG. 7) which, insofar as railcar journal bearings are concerned, may be on the railcar of which the bearing A is part, or in the locomotive which pulls the railcar, or even at a track-side location. The sensors 110, 112 and 114 must communicate with the remote processing unit 120, and to this end, a communication channel 122 exists between the two of them. Actually, the channel 122 lies between a transmitting device 124 and a receiving device 126. The transmitting device 124 is carried by the sensor module B, or at least is generally fixed in position with respect to the sensor module B, and of course the sensors 110, 112 and 114 are connected to the transmitting device 124, either directly or indirectly. The receiving unit 126 preferably exists at the processing unit 120 and is connected to the processing and archival circuitry within it.

Figure 7:
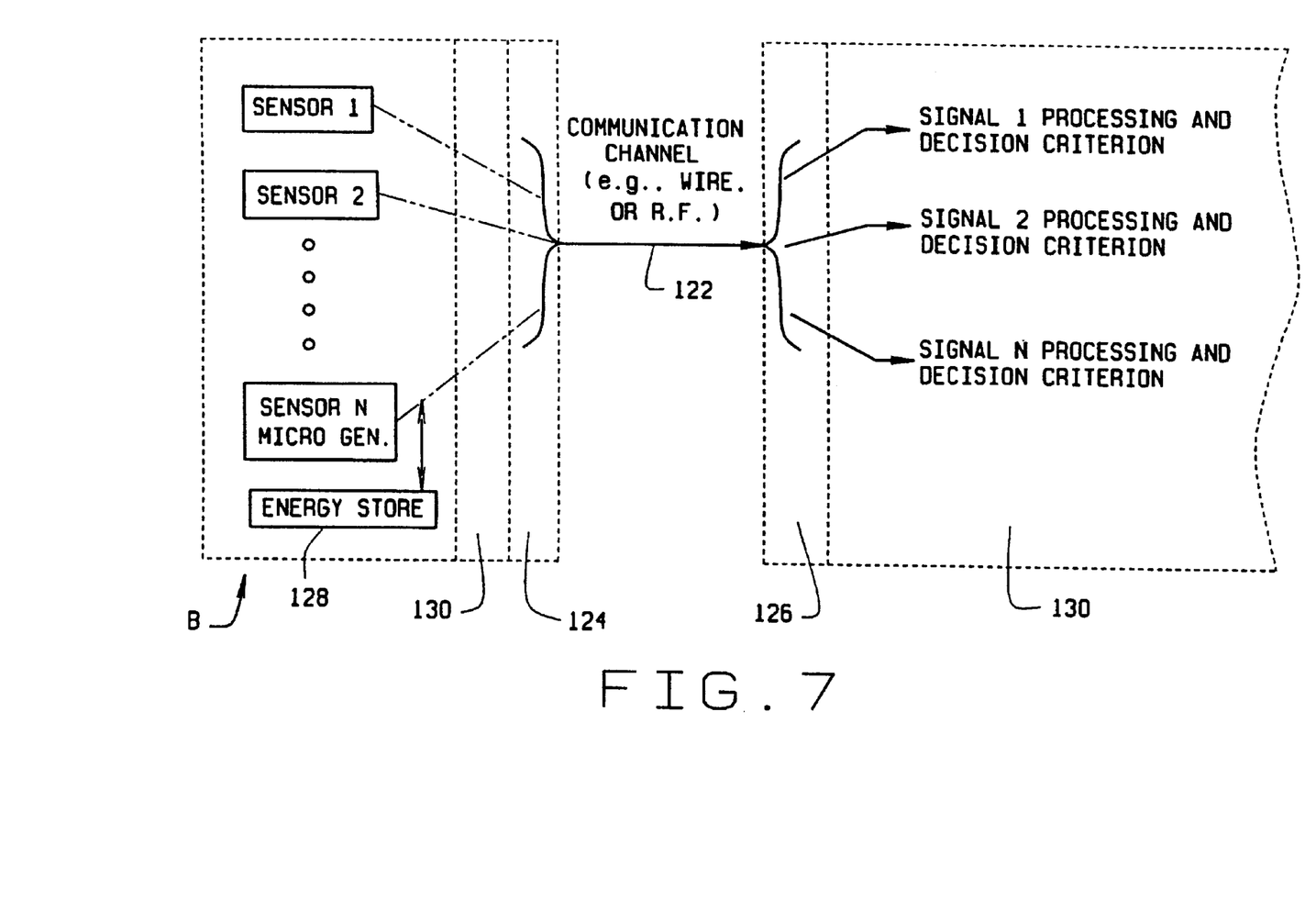
FIG. 7 is a schematic view showing a sensor module, a processing unit, and a communication channel between the two.

The communication channel 122 may take the form of a cable containing wires, in which event the transmitting and receiving devices 124 and 126 are simply electrical connectors. On the other hand, it may exist in the form of electromagnetic waves. In that form the transmitting device 124 is a radio transmitter and the receiving device 126 is a radio receiver. Both require electrical energy.

The receiving device 126, when in the form of a radio receiver, derives its electrical energy from the source which powers the processing unit 120. That may be a battery on a railcar or other site for the processing unit 120. In the preferred embodiment the electrical energy for the transmitting device 124, when it exists in the form of a radio transmitter, derives from a storage unit, specifically a battery 128, preferably located in the sensor module B. However, the battery B may be located elsewhere adjacent to the cup 46, such as in the block C or in the adaptor 34. Alternatively, the electrical energy may be supplied to the sensor module B by an external source other than a battery, such as a power supply.

The battery 128 has a finite capacity to store electrical energy and unless recharged may not last long enough to adequately service the radio transmitter that serves as the transmitting device 124. But with the availability of the rotating target wheel 118, the speed sensor 110 may also serve as an electrical generator or a separate microgenerator may be housed within the sensor module B. The target wheel 118 may simply present a variable reluctance path, or it may possess permanent magnets. Where the target wheel 118 has permanent magnets, its alternating poles pass by the end of the sensor module B, and the fluctuating magnetic field produced by them induces an electrical current in a coil within the sensor 110. A rectifier converts that current to direct current which recharges the battery 128.

Sometimes the raw signals produced in the sensor module B do not transmit well through the communication channel 122, but may be modified within the module B by a local microprocessor 130 to provide a more useful signal. For example, the vibrations detected by the acceleration sensor 114 may exist at many frequencies, some of which, owing to band width limitations, do not transmit well through the communication channel 122. The microprocessor 130 could be used to convert the signal delivered by the sensor 114 into a simple RMS energy level signal which is more effectively transmitted through the communication channel 122. Other forms of processing in addition to or beyond an RMS calculation are possible. By the same token, the pulses delivered by the speed sensor 110 may be converted by a microprocessor into a simple signal representing speed during a small increment of time, and that signal transmits quite easily through the communication channel 122. In that sense, signals are transmitted indirectly at the transmitting device 124.

The processing unit 120 processes the signals that are delivered through the communication channels 122 and receiving device 126. It has the capacity to archive certain signals and to convert signals into real time signals capable of energizing displays and activating alarms. The archival of raw or processed signal information enables one to track the performance of the bearing A over an extended period of time and to detect trends. As an example and with regard to the signals derived from the three sensors 110, 112 and 114, these signals once processed and stored in the processing unit 120, enable one to make the following assessments with regard to the operation and condition of the bearing A:

1. Speed—the instantaneous speed of the journal 20 based on pulses caused by the rotating target wheel 118; comparison of that speed with the speed of other bearings A operating under similar conditions, such as on the same railcar; archival of total cyclic history experienced by the bearing assembly;
2. Temperature—simple level detection; comparison with the temperature of other bearings A operating under similar conditions, such as with bearings on the same railcar.
3. Vibration—simple RMS measure of energy level over a given time interval; comparison of that energy level with past energy levels stored in the processing unit; comparison with energy levels of other bearings A operating under similar conditions.

The assessments have very real and useful applications insofar as the operation of the bearing A is concerned, for they enable one to determine the operating condition of the bearing A in real time, that is at any given instance, and to further evaluate the physical condition or "health" of the bearing A. Perhaps the most important objective is to recognize an imminent failure before it actually occurs and results in significant damage to the bearing A and related components as well. For example, if the speed sensor 110 in one of the bearings A produces a signal that indicates that the cones 48 of the bearing A are rotating at a velocity less than the cones 48 of the other bearings A, the reduced velocity suggests that the slower cones 48 are loose and are slipping on their journals 20. If the speed sensor 110 registers no angular velocity, the bearing A may have seized, perhaps by reason of a roller 50 being wedged between one of its cones 48 and the surrounding cup 46. Or it may indicate locked brakes, which can produce wheel flats. The signal derived from the speed sensor 110 may also provide the instantaneous velocity measurements required by antilock braking systems.

The acceleration sensor 114 will detect vibrations. This could represent irregularities or other defects in the track. But when the acceleration sensor 114 of one bearing A registers vibrations significantly greater than those registered by the sensors 114 of other bearings, a cause for concern exists. The vibration may derive from the wheel adjacent to the bearing A, most likely from a flat spot on the wheel. It may also indicate a defect in the bearing A itself. Spalling along one of the cup raceways 58 or along one of the cone raceways 66 represents the onset of bearing failure and manifests itself in vibration. A damaged roller 50 will also produce vibrations. An increase in the energy level of vibrations over a period of time suggests growing defects in the raceways 58 or 66 or the rollers 50. When the energy level reaches a certain threshold, the bearing A should be removed from service. Indeed, with many defects, vibrations signify the onset of bearing failure well before an elevation in temperature which invariably also accompanies such defects.

All bearings A that operate under similar conditions, such as on the same railcar, should exist at the same temperature. A significant differential in temperature between one bearing A and other bearings A suggests a defect in the bearing A with the elevated temperature.

The bearing A with its stabilizing blocks C fits within the pedestal 10 and is accommodated to the pedestal 10 by the adaptor 34. Neither the pedestal 10 nor the adaptor 34 fully encircle the bearing A. A slightly modified bearing D (FIG. 8) fits into a different adaptor or housing 140 having a full bore 142, and accordingly the housing 140 completely encircles the bearing D, limiting access to it. Even so, the bearing D is quite similar to the bearing A. It has a cup 46, cones 48 and tapered rollers 50, as well as a spacer ring 52 between the cones 48. However, the cup 46 does not contain a module hole 74, threaded holes 76 and pin holes 78, nor does it receive the sensor module B. Like the bearing A, the bearing D fits over an axle journal 20 and is clamped on that journal 20 with an end cap 28 and a wear ring 24 located between the end cap 28 and the outboard cone 48. The end cap 28 on its periphery has a target wheel 118 which may take the form of teeth spaced at equal circumferential intervals or magnetic poles of alternating polarity.

Figure 8:
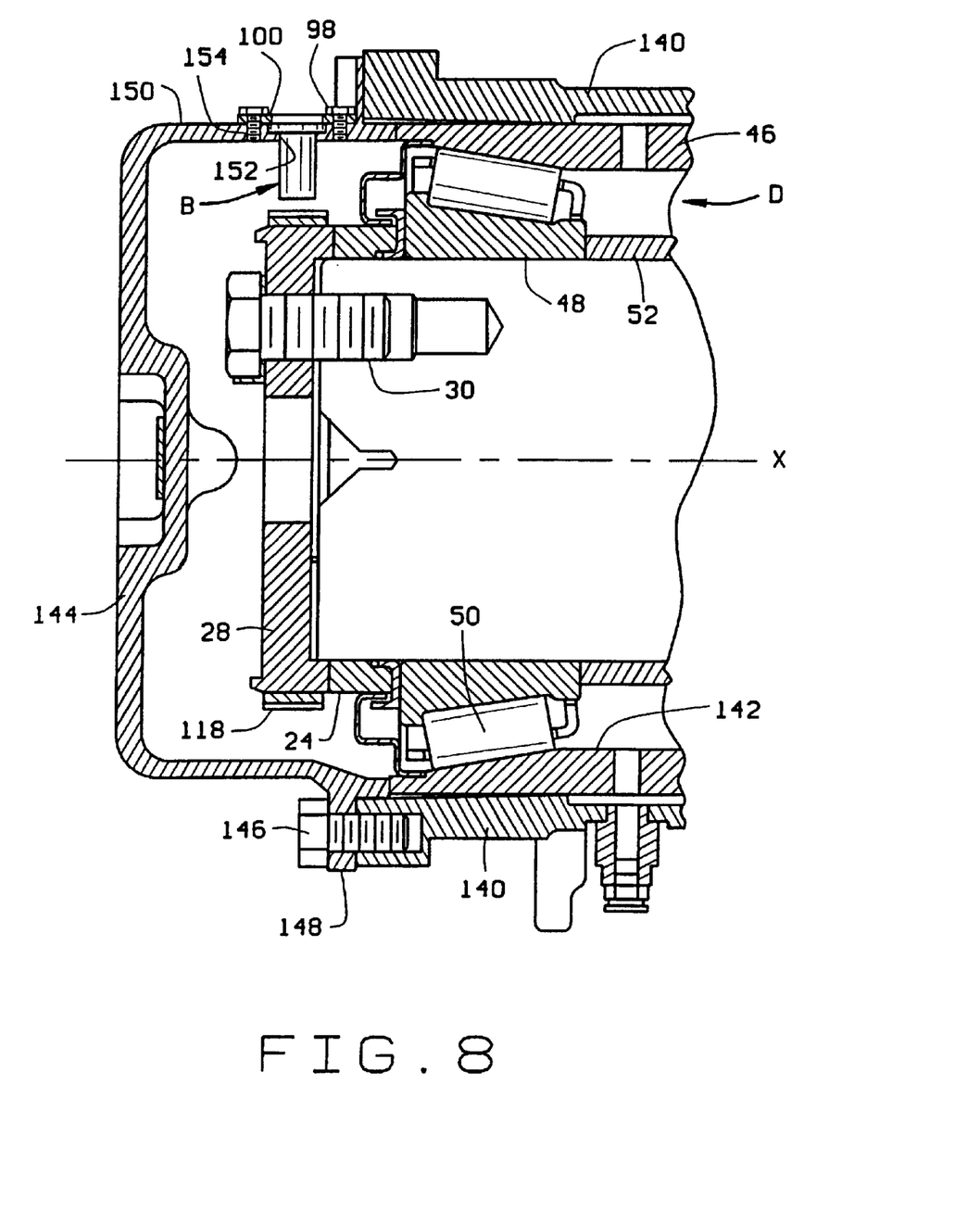
FIG. 8 is a partial sectional view of a bearing with a sensor module in the environs of the bearing, but not in the bearing itself.

Fitted against the end of the housing 140 is a cover 144 which extends across the end cap 28 and completely obscures it. More importantly, the cover 144 isolates the outboard end of the bearing D from the surrounding environment so that contaminants do not enter it. The cover 144 is actually attached to the housing 140 with machine bolts 146 which pass through a flange 148 on the cover 144. In the region of the flange 148, the cover 144 projects into the housing 140 where it bears against the end of the cup 46, thus preventing the cup 46 from moving axially out of the housing 140.

Adjacent to the flange 148, the cover 144 is directed generally axially, for in this region it must clear the end cap 28. Between two of the bolts 146 it is provided with an axially directed land 150 out of which a module hole 152 opens, as well as two threaded holes 154, one on each side of the module hole 152, the latter being designed to accommodate a retaining plate 100.

The module hole 152 is located directly outwardly from the target wheel 118 on the end cap 28 and receives the sensor module B. Indeed, it is counterbored at its outer end to accommodate the flange 106 on the sensor B. The retaining plate 100 lies against the land 150 to which it is fastened with machine screws 98 which thread into the threaded holes 154. The plate 100 lies over the flange 106 at the end of sensor module B and secures the sensor module B in the cover 144. While the sensor module B lies beyond the end of the bearing D, it still remains within the environs of the bearing D.

The sensor module B contains multiple sensors which operate as previously described.

A modified adaptor 160 (FIGS. 9 & 10) not only accommodates the bearing A to the generally orthogonal opening 12 in the side frame 2, but further secures the cup 46 of the bearing A against rotation or creep and provides a mounting for the sensor module B. To this end, the cup 46 has elongated holes 161 on each side of its three module holes 74, with the holes 161 being elongated in the direction of the axis x. Like the adaptor 34, the adaptor 160 has an arcuate seat 36, that conforms to the exterior surface of the cup 46, and lips 38 at the end of the seat to confine the cup 46 axially. The adaptor 160 also has an axial groove 162 which opens downwardly out of the arcuate seat 36, indeed at the very top of the seat 36. In addition, the adaptor 160 contains a narrow circumferential groove 164 which likewise opens out of the seat 36, but extends circumferentially from the axial groove 162 to the lower edge of the adaptor 160 to serve as a wireway. Finally, the adaptor 160 in the region of the axial groove 162 has a module hole 166, two screw holes 168, and two pin holes 170, with the pin holes 170 being located beyond the screw holes 168. The pin holes 170 contain pins 172 which are pressed into the holes 170 and project downwardly beyond the seat 36.

Figures 9, 10:
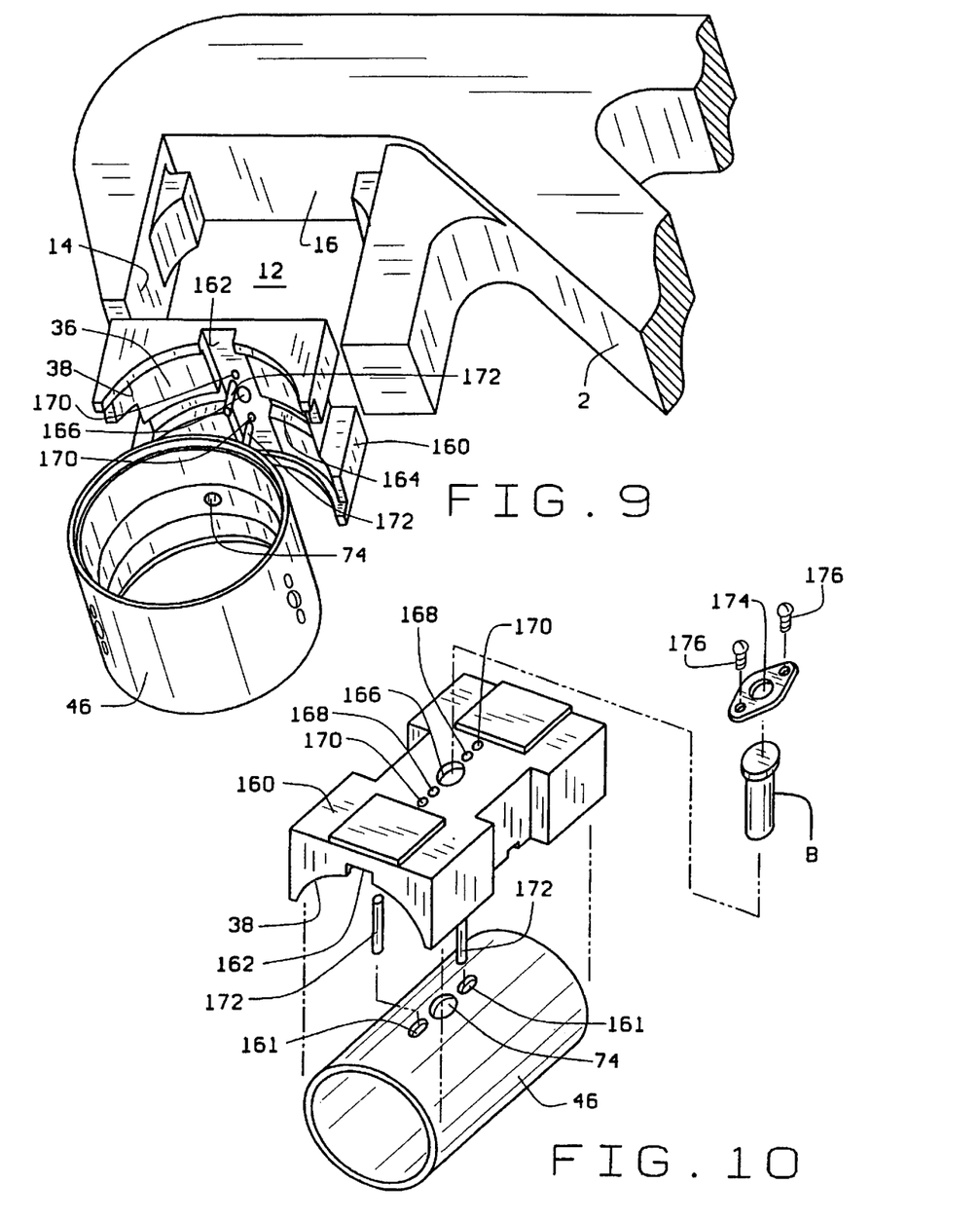
FIG. 9 is an exploded perspective view of a side frame, bearing cup, and a modified adaptor configured to accommodate a sensor module.
FIG. 10 is a top perspective view of the modified adaptor, as well as the sensor module and bearing cup.

The cup 46 of the bearing A fits against the arcuate seat 36 between the two lips 38, it being positioned such that one of the module holes 74 in its cup 46 is presented directly upwardly. That hole 74 aligns with the module hole 166 in the adaptor 160. The elongated holes 161 in the cup 46, on the other hand, align with the pin holes 170 in the adaptor 160 and receive the pins 172 which project from the holes 170. The holes 161 in the cup 46 are elongated in the direction of the axis x for the cup 46, this being to accommodate axial displacement of the cup 46 within the adaptor 160. In this regard, the spacing between the lips 38 on the adaptor 160 is slightly greater than the length of the cup 46.

The sensor B fits through the aligned module holes 166 and 74 in the adaptor 160 and cup 46 and projects into the interior of the bearing A, so that its inner end is located close to the target wheel 118 that is between the two rows of tapered rollers 50. The sensor module B effects a seal with the adaptor 160 and the cup 46, and a plate 174 fits over it to secure it in place, it being secured with screws 176 which thread into the screw holes 168 of the adaptor 160. Moreover, the shank 104 of the sensor B is encased in an elastomer which yields as the cup 46 shifts axially between the two lips 38 on the adaptor 160, thus enabling the sensor B to accommodate the axial displacement. The sensor module B contains multiple sensors which operate as previously described.

The remaining module holes 74 in the cup 46 are plugged to prevent contaminants from entering through them. Yet they remain available to receive the sensor module B when the cup 46 is indexed.

When the communication channel 122 takes the form of electromagnetic waves, the transmitting device 124, that is the radio transmitter, may be housed within the axial groove 162 of the adaptor 160. The same holds true with regard to the battery 128. On the other hand, when the communication channel 122 takes the form of wires bound together in a cable, the cable will extend through the circumferential groove 164.

What is claimed is:

1. A bearing for facilitating rotation about an axis, said bearing comprising: a fixed outer race having a pair of raceways presented inwardly toward the axis; a rotatable inner race having raceways presented outwardly toward the raceways of the outer race, rolling elements arranged in two rows between the raceways of the inner and outer races; a target wheel fixed in position with respect to the inner race between the raceways of the inner race so that it rotates with the inner race; a sensor module mounted on the outer race and projecting into the interior of that race between its raceways and the two rows of rolling elements, the module containing a plurality of sensors which detect different operating conditions of the bearing.

2. A bearing according to claim 1 wherein the sensor module contains a speed sensor which is presented toward the target wheel and produces a signal that reflects the angular velocity of the target wheel. the module also containing a temperature sensor that produces a signal that reflects the temperature of the bearing and an acceleration sensor that produces a signal which reflects accelerations experienced by the bearing.

3. A bearing according to claim 1 in combination with a housing having generally flat side walls, and further comprising at least one block attached to the outer race and being presented against the flat side wall, whereby the outer race will not rotate in the housing.

4. A bearing according to claim 3 wherein the sensor module extends through the block and is secured in the block.

5. In combination with a housing having an opening that is generally open at its bottom and is defined by at least one generally flat wall that is oriented generally vertically, and a shaft extending through the opening, a bearing located around the shaft and in the opening of the housing for enabling the shaft to rotate relative to the housing about an axis of rotation, said bearing comprising: an outer race located in the opening along the flat wall and having and having a generally cylindrical exterior surface and at least one raceway presented inwardly toward the axis; an inner race fitted over the shaft and having at least one raceway presented outwardly toward the raceway of the outer race; rolling elements arranged in a row between the raceways of the inner and outer races; and a block attached to the outer race against the cylindrical surface of that race at side of the cylindrical surface such that the block is offset vertically from the axis and does not significantly increase the width of the bearing and such that the top of the cylindrical surface is not obscured by the block so that vertically oriented loads are transferred to the outer race without passing through the block, the block having a laterally presented surface located along the flat wall of the housing opening, whereby the block prevents the outer race from rotating in the housing.

6. The combination according to claim 5 wherein that surface of the block which is presented toward the flat wall of the bearing opening is generally planar and generally parallel to the flat wall.

7. A bearing for facilitating rotation about an axis, said bearing comprising: an outer race having a raceway presented inwardly toward the axis; an inner race having a raceway presented outwardly toward the raceway of the outer race; rolling elements arranged in a row between the raceways of the inner and outer races; and a sensor module fixed in position with respect to one of the races such that it exists within the environment of the bearing, the sensor module containing a plurality of sensors capable of sensing different physical parameters so as to detect different operating conditions of the bearing.

8. A bearing according to claim 7 and further comprising a radio transmitter connected to the sensors for transmitting signals produced by the sensors to a remote processing unit.

9. A bearing according to claim 8 wherein the radio transmitter is in the sensor module.

10. A bearing according to claim 8 and further comprising a battery connected to the radio transmitter; and wherein the sensor module contains a microgenerator connected across the battery for charging the battery.

11. A bearing according to claim 10 wherein the microgenerator also detects the angular velocity of the other race of the bearing.

12. A bearing according to claim 7 wherein the sensor module contains a microprocessor for conditioning the signal produced by at least one of the sensors.

13. In combination with a side frame for a rail car truck, with the side frame having an opening that opens downwardly and is defined by flat side faces which are parallel and oriented generally vertically and an upper surface that extends between the side faces, and with an adapter that fits into the opening of the side frame and against the upper surface and has an arcuate seat which is presented downwardly, an antifriction bearing for enabling an axle to rotate relative to the side frame while transferring vertically oriented loads from the side frame to the axle, said bearing comprising: an outer race having a cylindrical exterior surface that is located in the opening of the side frame between the two side walls and is against the arcuate bearing seat on the adapter, the outer race also having a raceway that is presented inwardly toward the axis; an inner race located within the outer race and having a raceway that is presented toward the raceway of the outer race; rolling elements located in a row between the raceways of the inner and outer races; and a block secured to the outer race against the cylindrical exterior surface of that race below the adapter, the block having a laterally presented surface that is located along one of the flat walls of the side frame to prevent the outer race from rotating in the opening of the side frame.

14. The combination according to claim 13 wherein the outer surface of the block is generally flat.

15. The combination according to claim 13 wherein the block supports a sensor which monitors the operation of the bearing.

16. The combination according to claim 15 wherein the sensor projects through the outer race and into the interior of the bearing.

17. The combination according to claim 13 wherein the bearing has its raceways located oblique to the axis and is capable of transmitting thrust as well as radial loads, and the adapter at the end of its seat has lips which project over the end of the outer race and prevent the outer race from moving axially in the adapter.

18. The combination according to claim 13 wherein the block is one of a pair of blocks; and wherein the other block has its surface located along the other flat wall at the opening of the side frame.

19. The combination according to claim 13 wherein the laterally presented surface of the block is planar and parallel to the flat surface of the side frame along which the block is located.

20. The combination according to claim 19 wherein the block has an arcuate surface that is against the cylindrical exterior surface of the outer race.

21. The combination according to claim 20 wherein the block has another laterally directed surface, and the two laterally directed surfaces are presented at about 120° with respect to each other.

22. The combination according to claim 19 wherein the block is one of a pair of blocks, and wherein the other block has a laterally presented surface located along the other flat wall at the opening in the side frame.

23. The combination according to claim 13 wherein the block is offset vertically from the axis of the bearing and does not significantly increase the width of the bearing.

24. The combination according to claim 23 wherein the block is located below the axis of the bearing.

* * * * *